Patented Dec. 12, 1933

1,938,574

UNITED STATES PATENT OFFICE 1,938,574

DEXTRINIZATION OF STARCH IN CEREALS

Hans F. Bauer, Chicago, Ill., assignor to Stein, Hall Manufacturing Company, Chicago, Ill., a corporation of Delaware No Drawing. Application September 30, 1931
Serial No. 566,161

20 Claims. (Cl. 127—32)

This invention relates broadly to the manufacture of commercial dextrin, mono-saccharoses, such as glucose, and adhesive products, from cereals as distinguished from starch. By the term "cereals" as hereinafter used in the specification and claims, I mean to include all grains and other vegetable substances containing substantial amounts of starch such as wheat, rye, corn, rice, peas, beans, and similar substances in either milled or unmilled condition.

It should be understood that the term "commercial dextrin" does not necessarily mean chemically pure dextrin—but is a term generally used to designate the mixture of starch, starch isomerides, and reducing sugars along with smaller amounts of other substances—that is obtained by breaking or partially breaking down or hydrolyzing starch or cereal of high starch content by means of heat, acids, acid salts, enzymes, combinations of these means or other catalysts.

Ordinarily the dry commercial dextrins or British gums are made by roasting substantially pure starch, either with or without small amounts of acid or other catalysts, until a product of the desired color, solubility, viscosity and other physical characteristics is obtained.

The wet converted liquid dextrins and dextrin pastes are usually made by cooking starch with water and a small amount of some acid or other catalyst, or else by treating gelatinized starch with some enzyme, such as malt diastase or other catalyst.

As I understand it, the hydrolysis of starch is a catalytic reaction and I use the words catalytic and catalytic reaction and catalyzer in the following description in their broadest sense.

The common practice of adding acid or other catalyst to starch is in water solution or suspension. When moisture is added to cereals in finely ground or milled condition, ordinarily a tough elastic dough or gel forms which more or less completely envelops either the entire mass or part of the mass. In treating cereals in the form of whole grain the outer shell protein and oils generally prevent the moisture from penetrating into the cereals to contact with the starch contained therein. Accordingly a heterogeneous product is formed preventing the intimate distribution of the ingredients, thus interfering with the conversion reaction.

Heretofore, it has been impossible to satisfactorily dextrinize cereals without first grinding the same to the form of a flour or meal and then removing certain of the proteins, fibre and fats naturally present in these cereals, due to the fact that these substances interfere with proper conversion of the starch into dextrins or other conversion products. However, even in milled products a considerable portion remains in the flour.

An object of this invention is to provide an improved process for dextrinizing cereals, or otherwise modifying their starch content, adapted to render it unnecessary to first remove the proteins, fibre or fats from the cereal.

A further object consists in providing a new process for treating cereals in such manner that the protein, fat, fibre and other impurities present do not interfere with the usual process of dextrinization or other conversion, such as by hydrolysis of the starch present.

A further object is to produce an improved dextrin or other converted product containing the modified or unmodified proteins, and the other incidental ingredients of the cereal.

My invention is based upon the discovery that prevention of interference by materials other than starch in the process of dextrinizing or otherwise converting the starch in cereal may be accomplished by any one of the following methods:

First, by treating the cereal in coarsely broken, cracked or unmilled condition with a catalytic conversion agent in a fluid form.

Second, by treating the cereal in either milled or substantially unmilled, broken, or cracked condition with a catalytic agent in a fluid form in the presence of a chemical or chemicals which have a liquefying or degelling action on certain of the components of the cereal normally forming a dough or gel when in the presence of moisture.

In practicing my invention in accordance with my first method, cereal grains such as wheat, rye, corn, rice, peas, and beans, are preferably subjected to a slight grinding or crushing action, whereby the outer shells at least are broken or cracked, but the grain remains in a coarsely granular or substantially unmilled condition.

It is to be understood that when reference is hereinafter made in the specification and claims to cereals in "substantially unmilled condition" I mean to include cereals in the coarsely broken or cracked condition as above described, and as distinguished from meal or flour. It is possible of course to obtain some conversion of the starch in substantially whole grains by preliminarily liquefying the outer shell by means of a liquefying or degelling agent, such as, for example, those disclosed below. In such a case any milling operation would be unnecessary.

The cereals in this substantially unmilled condition may be treated by a catalytic agent, such as hydrochloric acid, in a fluid form. The catalytic agent is preferably sprayed into the cereal in the form of a solution. However, the solution of catalytic agent may be brought into contact with the cereal by any other desired method of contacting.

Another method of acidifying the cereal would be to introduce the acid in the form of hydrochloric acid gas or to mix an acid salt, such as aluminum chloride, with the cereal and subsequently releasing hydrochloric acid fumes by any suitable means, such as heat.

By treating the cereal in a substantially unmilled form, instead of in the form of a flour, the tendency for formation of a handicapping dough or gel and agglomerated masses is not as great as when a milled cereal is treated. The converting agent penetrates into the cracks of the broken grain and is enabled to come into intimate contact with substantially all of the starch contained therein and slightly modify or convert it.

In practicing my invention in accordance with my second method, the cereal is treated in either the milled or unmilled condition with a catalytic agent such as hydrochloric acid and a substance which tends to increase the speed of the reaction, and which appears to have a degelling or liquefying action on the glutinous content of the cereal, preventing the formation of a dough or gel when in the presence of moisture. Such accelerating or liquefying agents are apparently all ionogens. Among those substances, which I have found to be particularly useful as accelerating or liquefying agents, are salts or addition compounds of sulphurous acid, that is, compounds which are capable of liberating sulphurous acid by hydrolysis.

One group of compounds which I may use are salts, such as sodium bisulphite, or addition compounds of anhydrides of sulphurous acid, such as metabisulphites or pyrosulphites, for example, sodium metabisulphite and sodium pyrosulphite.

Another group of compounds which I may use are the derivatives of sulphurous acid by reduction, such as sodium hydrosulphite or its organic addition compounds with aldehydes and ketones such as sodium sulphoxylate formaldehyde or sodium formaldehyde sulphoxalate.

Still another group which I may use are hydrogen sulphide or sulphydryl and derivatives thereof. Examples of this group are sodium sulphide, potassium sulphide, ammonium polysulphide, sodium xanthate, and organic sulphydryl compounds, in the form, for example, of potassium ethyl-xanthate, sodium diethyl dithio carbamate, thiocresol or thionaphthol. Thio-carbonates of these substances may be used, for example, sodium tri-thio-carbonate.

While I have disclosed certain groups of specific compounds to be used as accelerating or liquefying agents, other compounds may be used to obtain the desired liquefying or degelling action. The theory of this liquefying or degelling action is not yet fully understood, so that I do not wish to be limited to the causing of such action solely by the compounds disclosed herein but my invention is to be understood to include any substance which will have such action.

In practicing this second method, the cereal, preferably in a substantially unmilled condition, may be treated by spraying or otherwise mixing a solution of the catalytic agent and an accelerating or liquefying agent into the cereal or by treating the cereal with a catalytic agent and an accelerating or liquefying agent in the gaseous state. This method may be used for treating the cereals in a finely divided or milled condition. The effect of the accelerating or liquefying agents would appear to be due to a liquefying action on the glutinous or gel-forming constituents of the cereals. For example, in the treatment of a cereal in the milled state, when 50 pounds of flour and 50 pounds of water are mixed and worked into a stiff dough, and a quarter of a pound of sodium bisulphite is then worked into the dough, the mass very shortly loses its dough character and seems to liquefy. Only very small amounts of these agents need be used, it usually being necessary to employ only about 0.4% and in some cases about 1% of the modifying agent to the agent being treated.

When these accelerating or liquefying agents are employed in the treatment of cereals in their substantially unmilled condition, the conversion of the starch in the cereal is greatly accelerated. This may be due to the degelling or liquefying action of these agents, which, upon coming into contact with the glutinous and other non-starch components of the grain which tend to interfere with the conversion of the starch, appear to modify and liquefy these components of the cereal and allow the catalytic agent to more rapidly penetrate into the cereal and come into intimate contact with the starch contained therein, and thus permit the conversion to proceed more rapidly and efficiently.

By the use of my invention, it is possible to make a good commercial dextrin directly from various cereals, containing substantial quantities of protein and other incidental ingredients, whereas heretofore it has been considered necessary to use substantially pure starch.

The final product obtained by my process may contain a certain amount of gluten or modified gluten or proteins in addition to dextrin, starch gums and sugar in proportions depending on the conversion or hydrolysis of the starch present. Experience has proved that the presence of this with the dextrins, gums or sugars is not detrimental, since it has adhesive properties in itself which supplement those of the dextrin. In fact, it gives rise to certain physical properties which render the product for many purposes much superior to a commercial dextrin and gum mixture made from starch.

I have found this product very suitable for most purposes for which commercial dextrin is used; some of the more notable examples being bakers' dextrin, linoleum cements, carton sealing glues, core binders, textile sizes and paper sizes, bag pastes, and adhesives.

If desired, the conversion may be carried to such a degree that a compound substantially similar to commercial glucose is formed. This product may be utilized by the trade in combination with modified or unmodiled protein matter present or a separation may be made.

As a specific illustration of the application of my invention, I give the following description of an actual conversion using corn:

A solution containing 150 parts of water, 20 parts of 21° Bé. hydrochloric acid and 3 parts of sodium bisulphite is sprayed into 2000 parts of cracked corn kernels in such manner, as by stirring the cereal mass, as to bring the sprayed solution into intimate contact with all the particles of the corn. When this has been accomplished, the mixture may be heated in pans, steamjacketed drums, or some other form of roasting device, and heated to about 250° C. This temperature is maintained for about 20 hours, when the heat is shut off, and the conversion terminated. Upon examination of the product produced in this manner, it will be found that the material has changed considerably in color, having become a rather dark brown. After grinding into a flour, this material will have a solubility of about 31% and can be made up into a very thick paste, with 1 to 1 and ¼ parts of hot water.

A further illustration of an actual conversion is as follows:

A solution made up of 150 parts of water, 20 parts of 21° Bé. hydrochloric acid and 4 parts of sodium sulphite was sprayed into 2000 parts of hominy grits in such manner as to cause the solution to come into intimate contact with all the grits. The resulting mixture was then heated in pans or other form of roasting device to a temperature of 250° C. for about ten hours. At the end of ten hours, the material turned to a light tan in color and had become 51% soluble in water. This material forms a nice soft paste when cooked up with water in proportions of one part of material to one part water.

In the case of manufacturing a liquid commercial dextrin, dextrin paste or sugar such as glucose, directly from cereals by means of a conversion process in which moisture is present, a general procedure making use of my invention would be as follows:

The dry cereal, or a cereal and water mixture, is first treated with sulphur dioxide or a sulphite salt in such a way as to render inert the proteins, fibre and fat, preventing the formation of a dough or gel, and then this treated cereal is converted in the presence of moisture by means of heat, acids, acid salts, enzymes or other catalysts, or combinations of these means, into a product of the desired characteristics.

It should be understood that the general methods of procedure, given above to illustrate the application of my invention in the manufacture of commercial dextrin directly from cereals by either wet or dry processes, are only typical examples showing ways in which my invention can be applied, and do not necessarily limit its scope to these particular examples.

There are several important factors which will influence the characteristics of the final product:

(1) The amount of sulphur dioxide used in breaking down the proteins.

(2) The amount and the kind of acid or other catalyst used to convert the starch. (In this particular example I used hydrochloric acid, but, if desired, a number of other acids or acid salts or mixtures of them may be used, a few typical ones being nitric acid, acetic acid and formic acid).

(3) The length of time the cereal is converted.

(4) The temperature at which the cereal is converted.

(5) The type or kind of cereal that is being converted.

(6) The fineness of the material treated.

(7) The neutralizing agents used during or at the end of the conversion, if one is used.

By changing or varying any or all of these influencing factors, the manufacturer can obtain any final product desired, varying from one slightly modified and one that mixes with water to form a heavy white paste to a product of the nature of commercial glucose which may or may not be separated from the protein matter present.

In general, when I use the term "dry or substantially dry" in connection with the description of this invention and the claims, I mean to refer to a condition in which the flour or cereal mass is not in a water liquid state. Cereal, of course, may normally have in it a small percentage of moisture. Furthermore, cereal or flour may absorb upwards from 55–70% moisture with a change towards a rather stiff dough which, however, is ordinarily dry to the feel or touch. After the maximum water absorption point of the flow is passed the gel breaks down and a flowing or viscous, wet state prevails and the flour is no longer considered in a substantially dry condition.

Preferably in carrying out my process I operate with a percentage of water well below the maximum absorption point of the flour or cereal. Even such lower percentages of moisture cause, however, the same gelling action of minute particles and have the same deterrent effect upon the action of the starch conversion agent. In my use of the term "dry", therefore, I mean to refer to any conditions of a cereal below that condition in which sufficient water is present to have the flour or cereal mass in a water liquid state or any point below maximum absorption point of the flour or cereal under treatment.

I always operate within these ranges.

Although the foregoing description in many respects is specific, still it is to be understood that my intention is to protect this invention as broadly as consistent with the prior art and a reasonable interpretation of the terms and spirit of the following claims.

I claim:

1. The method of converting starch in a substantially unmilled cereal in which a gel problem exists, said conversion taking place substantially in the dry, said cereal having starchy and non-starchy components, which comprises adding a non-starchy component liquefying agent, and a starch conversion agent to said cereal and heating.

2. The method of converting starch in cereal, said conversion taking place substantially in the dry, said cereal having starchy and non-starchy components, which comprises adding sufficient non-starchy component liquefying agent to liquefy said non-starchy component while preventing the formation of a water liquid cereal mass, adding a starch conversion agent to moisten said cereal while preventing the formation of a water liquid cereal mass and heating.

3. The method of converting starch in cereal substantially in the dry, said cereal having starchy and non-starchy components which comprises adding only sufficient non-starchy component liquefying agent and starch conversion agent to moisten said cereal and heating.

4. The method of converting starch in cereal substantially in the dry, said cereal having starchy and protein ingredients, adding only sufficient protein liquefying agent and starch conversion agent to moisten said cereal and heating.

5. The method of converting starch in cereals substantially in the dry which comprises moistening a cereal with a starch converting agent and a substance which renders inert the natural proteins and fats present in the cereal while preventing the formation of a water liquid cereal mass, and converting the starch in the cereal by means of heat.

6. In the process of preparing a converted starch product from a cereal in which a gel problem exists the step which comprises treating relatively in the dry state the cereal in substantially unmilled condition comprising starchy and non-starchy components with a starch conversion catalytic agent and a non-starchy component liquefying substance.

7. The method of converting starch substantially in the dry and while in the presence of substantial amounts of protein matter which comprises moistening a cereal in substantially unmilled condition with a solution of a starch conversion agent and a protein liquefying substance, and then converting the starch.

8. The method of converting starch in cereals in which a gel problem exists substantially in the dry having starchy and non-starchy components which comprises treating a cereal with a starch conversion agent in a vaporous state and a substance adapted to act with the non-starchy components to inhibit the formation of a gel therefrom, and then converting the starch.

9. In the process of converting starch substantially in the dry in cereals in which a gel problem exists, said cereals having starchy and non-starchy components the step which comprises treating cereals in substantially unmilled condition with a gaseous starch conversion agent and a non-starchy gel inhibiting substance.

10. A substantially dry converted product comprising converted cereal starch having combined therewith all of the natural elements of the cereal and in a substantially whole or unmilled condition.

11. A substantially dry converted product made from starch-containing cereal, comprising converted starch and the naturally incidental co-ingredients derived from said cereal, the product being in a substantially unmilled condition.

12. A substantially dry converted product from cereal comprising converted cereal starch and the naturally incidental co-ingredients including modified and unmodified protein, fat and fibre, the product being in a substantially unmilled condition.

13. The method of converting starch in cereals substantially in the dry, said cereals having starchy and non-starchy components which comprises treating said cereal with a starch converting agent and a derivative of sulphurous acid having the general degelling properties of sulphurous acid, maintaining the treated cereal in a relatively dry state, and converting the starch component by means of heat.

14. The method of converting starch in cereals in which a gel problem exists substantially in the dry, said cereals having starchy and non-starchy components which comprises treating said cereal with a starch converting agent, and an addition compound of sulphurous acid having the general degelling properties of sulphurous acid whereby the non-starchy components are modified and converting the starchy components in said cereal by means of heat.

15. The method of converting starch in cereals substantially in the dry, said cereals having starchy and non-starchy components which comprises treating said cereal with a starch converting agent and a reduced derivative of sulphurous acid having the general degelling properties of sulphurous acid whereby the non-starchy material is modified, maintaining the cereal in a relatively dry state, and converting the starchy material present in said cereal by means of heat.

16. The method of converting starch in cereals substantially in the dry, said cereal having starchy and non-starchy components which comprises treating said cereal with a starch converting agent, a derivative of hydrogen sulphide having the general degelling properties of hydrogen sulphide whereby the non-starchy material is modified, maintaining the cereal in a relatively dry state, and converting the starchy component present in said cereal by means of heat.

17. The method of converting starch in cereals substantially in the dry, said cereal having starchy and non-starchy components which comprises treating a cereal with a starch conversion agent, and a compound selected from the group consisting of sulphur dioxide, sodium bisulphite, sodium metabisulphite, sodium pyrosulphite, sodium hydrosulphite and its organic addition compounds with aldehydes and ketones, sodium formaldehyde sulphoxylate, hydrogen sulphite, sodium sulphide, ammonium polysulphide, sodium xanthate, potassium ethyl xanthate, sodium diethyl dithio carbamate, thiocresol, thionaphthol and sodium tri-thiocarbonate, whereby the non-starchy components are modified, maintaining the cereal in a relatively dry state, and converting the starchy components present in said cereal by means of heat.

18. The method of converting starch in cereals substantially in the dry, said cereal having starchy and non-starchy components which comprises treating a cereal with a starch conversion agent, and a compound selected from the group consisting of addition compounds of sulphurous acid, addition compounds of anhydrides of sulphurous acid, reduced derivatives of sulphurous acid having the general degelling properties of sulphurous acid, organic addition compounds of sulphurous acid, derivatives of hydrogen sulphide having the general degelling properties of hydrogen sulphide, and organic sulphydryl compounds having the general properties of hydrogen sulphide, whereby the non-starchy components are modified, maintaining the cereal in a relatively dry state, and converting the starchy components present in said cereal by means of heat.

19. A substantially dry converted non-gelatinized product from cereal comprising converted cereal starch and acid modified non-starchy components, said product having therein substantially all of the natural co-ingredients of the cereal.

20. A substantially dry converted non-gelatinized product from cereal comprising converted cereal starch and acid modified non-starchy components, said product having therein substantially all of the natural elements of the cereal and containing less than ten per cent by weight of reducing sugars.

HANS F. BAUER.